United States Patent
Lakhzouri et al.

(10) Patent No.: US 8,611,247 B2
(45) Date of Patent: Dec. 17, 2013

(54) DYNAMIC DATA RETRIEVAL IN A WLAN POSITIONING SYSTEM

(75) Inventors: Abdelmonaem Lakhzouri, Tampere (FI); Florean Curticapean, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 13/357,277

(22) Filed: Jan. 24, 2012

(65) Prior Publication Data

US 2013/0188626 A1    Jul. 25, 2013

(51) Int. Cl.
*H04Q 11/00* (2006.01)

(52) U.S. Cl.
USPC ........ 370/252; 342/450; 370/328; 455/456.5; 455/457; 707/617

(58) Field of Classification Search
None
See application file for complete search history.

(56) References Cited

U.S. PATENT DOCUMENTS

| | | | |
|---|---|---|---|
| 7,471,954 B2 * | 12/2008 | Brachet et al. | 455/456.5 |
| 7,474,897 B2 * | 1/2009 | Morgan et al. | 455/456.5 |
| 7,515,578 B2 * | 4/2009 | Alizadeh-Shabdiz et al. | 370/338 |
| 7,999,742 B2 * | 8/2011 | Alizadeh-Shabdiz | 342/463 |
| 8,200,251 B2 * | 6/2012 | Huang | 455/457 |
| 8,244,272 B2 * | 8/2012 | Morgan et al. | 455/456.1 |
| 8,433,334 B2 * | 4/2013 | Huang et al. | 455/456.1 |
| 8,504,059 B2 * | 8/2013 | Huang et al. | 455/456.1 |
| 2004/0162896 A1 | 8/2004 | Cen et al. | |
| 2006/0200843 A1 | 9/2006 | Morgan et al. | |
| 2008/0176583 A1 | 7/2008 | Brachet et al. | |
| 2010/0178934 A1 | 7/2010 | Moeglein et al. | |
| 2011/0176523 A1 | 7/2011 | Huang et al. | |
| 2011/0257923 A1 | 10/2011 | Boulton | |

FOREIGN PATENT DOCUMENTS

| EP | 2362702 A1 | 8/2011 |
|---|---|---|
| WO | 2005004527 | 1/2005 |

OTHER PUBLICATIONS

International Search Report and Written Opinion—PCT/US2013/021600—ISA/EPO—Apr. 26, 2013.

* cited by examiner

*Primary Examiner* — Donald Mills
(74) *Attorney, Agent, or Firm* — Mahamedi Paradice Kreisman LLP (57) ABSTRACT

A WLAN positioning system for calculating the geographic location of a mobile device minimizes the amount of data retrieved from a remote access point location server by dynamically switching between public fetching operations and private fetching operations in response to one or more parameters including, for example, whether the mobile device is in motion, the data retrieval history of the mobile device, and/or the capacity and utilization of local memory provided within the mobile device.

23 Claims, 8 Drawing Sheets

DYNAMIC DATA RETRIEVAL IN A WLAN POSITIONING SYSTEM

TECHNICAL FIELD

The present embodiments relate generally to wireless networks, and specifically to determining the location of Wi-Fi enabled wireless devices.

BACKGROUND OF RELATED ART

Modern navigation systems frequently use a global navigation satellite system (GNSS) for position determination. However, the recent proliferation of Wi-Fi access points in wireless local area networks (WLANs) has made it possible for navigation systems to use these access points for position determination, especially in areas where there is a large concentration of active Wi-Fi access points (e.g., urban cores, shopping centers, office buildings, and so on). Indeed, WLAN positioning systems can be advantageous over GNSS in certain environments because of GNSS signal coverage limitations. For example, while GNSS signals may not be readily detectable inside structures such as shopping malls and office buildings (e.g., due to signal attenuation and/or multipath effects), wireless signals generated by Wi-Fi access points located within such structures are typically detectable by each other and by Wi-Fi enabled mobile devices within range of such access points.

For WLAN positioning systems, the locations of the Wi-Fi access points are used as reference points from which well-known trilateration techniques can determine the location of a mobile device (e.g., a Wi-Fi-enabled cell phone, laptop, or tablet computer). More specifically, the mobile device can use the received signal strength indicators (RSSI) associated with a number of visible access points as indications of the distances between the mobile device and each of the detected access points, where a stronger RSSI means that the mobile device is closer to the access point and a weaker RSSI means that the mobile device is further from the access point. The mobile device can also use the round trip time (RTT) of signals transmitted to and from the access points to estimate the distances between the mobile device and the access points. Once these distances are estimated, the location of the mobile device relative to the access points can be determined using trilateration techniques.

Whether using RSSI or RTT techniques to determine the distances between the mobile device and the visible Wi-Fi access points, the precise geographic location (e.g., latitude and longitude) of at least three such access points needs to be known to establish the absolute location of the mobile device. A number of online location databases can be used to determine the locations of large numbers of actively deployed Wi-Fi access points according to their unique basic service set identifier (BSSID) values. For example, companies including Google, Skyhook, Devicescape, and WiGLE have built access point location severs (APLS) of BSSID values and the geographic locations of their corresponding access points. Typically, the location of a particular access point is first determined either manually (e.g., using electronic mapping) or using the access point's embedded GNSS capabilities, and then the access point's location is uploaded (along with the access point's BSSID value) to the access point location server. Thereafter, a mobile device can determine the precise location of a selected visible access point by obtaining the BSSID from the access point, providing the BSSID to the location server, and then receiving the access point's location coordinates from the location server.

Once the location coordinates of 3 visible access points are known to the mobile device, positioning software operating on the mobile device can use the estimated distances between itself and each of the 3 access points (e.g., calculated using ranging operations involving RTT and/or RSSI techniques) to calculate the location coordinates of itself using trilateration techniques. It is noted that to continually provide accurate location information to mobile devices, the access point location servers are frequently updated because of the relatively transient nature of Wi-Fi access points (e.g., access points are often moved, serviced, and/or decommissioned).

Performance of the positioning software on the mobile device may be constrained by the physical limitations of the mobile device and/or by network limitations. For example, the physical limitations of the mobile device may include memory capacity and power consumption, and the network limitations may include limited network bandwidth and/or accessibility of the access point location server by the mobile device. These limitations can create optimization problems for efficiently managing and distributing Wi-Fi access point location data to mobile devices. Thus, there is a need to more efficiently retrieve and manage location information of access points associated with a wireless network.

BRIEF DESCRIPTION OF THE DRAWINGS

The present embodiments are illustrated by way of example and are not intended to be limited by the figures of the accompanying drawings, where.

DETAILED DESCRIPTION

In accordance with the present embodiments, accurate position capability can be provided using a Wireless Local Area Network (WLAN). As used herein, the term WLAN can include communications governed by the IEEE 802.11 standards, Bluetooth, HiperLAN (a set of wireless standards, comparable to the IEEE 802.11 standards, used primarily in Europe), and other technologies having relatively short radio propagation range. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

In accordance with the present embodiments, a wireless local area network (WLAN) positioning system and method for calculating the geographic location of mobile devices are disclosed that minimize the amount of data retrieved from an access point location server. The WLAN positioning system includes a plurality of Wi-Fi access points and an access point location server (APLS) that can be remotely accessed by a mobile device (e.g., a cell phone or tablet computer). The APLS, which stores identification and location information of the access points, can be requested to provide such information to the mobile device so that the mobile device can use the access points as reference points in calculating the mobile device's location using trilateration techniques. The mobile device minimizes the amount of data retrieved from the APLS by dynamically switching between public fetching operations and private fetching operations in response to one or more parameters including, for example, whether the mobile device is in motion, the data retrieval history of the mobile device, and/or the capacity and utilization of local memory provided within the mobile device.

More specifically, for some embodiments, the mobile device includes a local memory that stores a cache of Wi-Fi access point location data, and includes a processor that can execute WLAN positioning software and APLS data retrieval software. The positioning software may calculate the position of the mobile device using the locations of a number of nearby access points as reference points. The data retrieval software may selectively request location data for Wi-Fi access points from the APLS using public and/or private fetching operations, and may dynamically switch between such fetching operations in response to parameters such as motion of the mobile device, the storage capacity of the local cache memory, the data retrieval history of the mobile device, and/or the refresh rate of the APLS. Further, for some embodiments, the amount of data retrieved from the APLS during public fetching operations can be dynamically altered to minimize the retrieval of duplicate access point location data.

Figure 1:
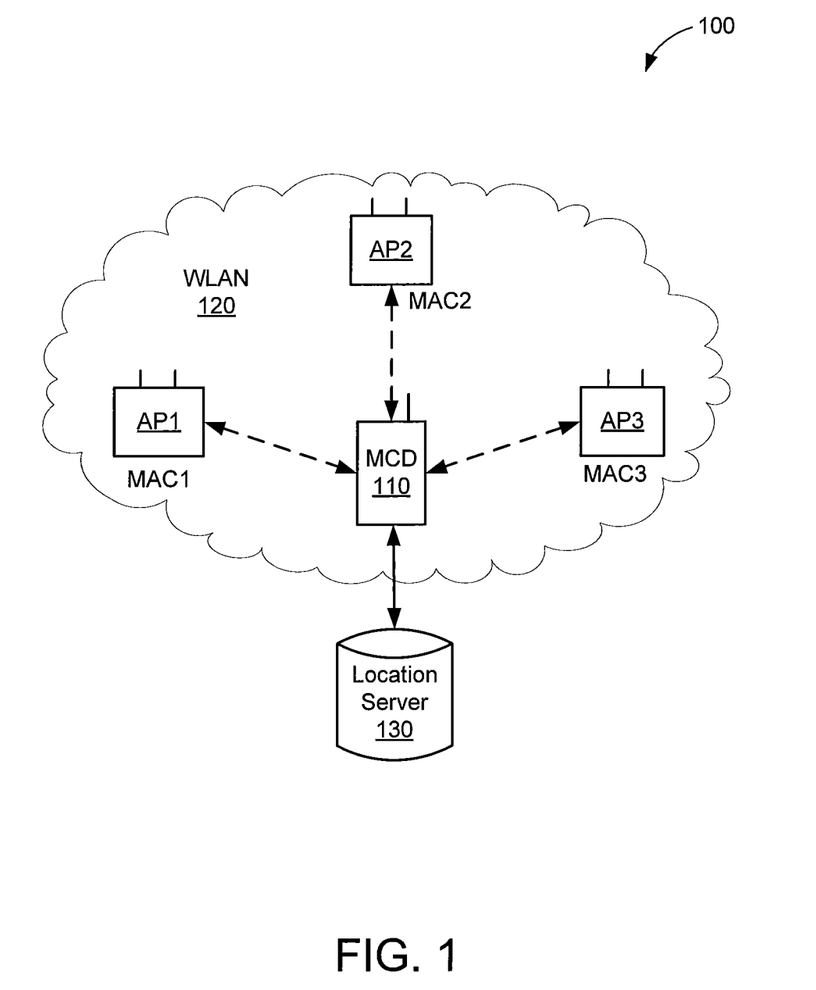
FIG. 1 is a block diagram of a WLAN positioning system within which the present embodiments can be implemented.

FIG. 1 is a block diagram of a wireless positioning system 100 in accordance with the present embodiments. System 100 is shown to include a mobile communication device (MCD) 110, a wireless local area network (WLAN) 120, and an access point location server (APLS) 130. The WLAN 120 is formed by a plurality of Wi-Fi access points (APs) that may operate according to the IEEE 802.11 family of standards (or according to other suitable wireless protocols). Although only three access points AP1-AP3 are shown in FIG. 1 for simplicity, it is to be understood that WLAN 120 can be formed by any number of access points. Each of access points AP1-AP3 is assigned a unique MAC address (i.e., MAC1-MAC3, respectively) that is programmed therein by, for example, the manufacturer of the access point. Each MAC address, which may be commonly referred to as the "burned-in address," the organizationally unique identifier (OUI), or the BSSID, in one embodiment includes six bytes of data. The first 3 bytes of the MAC address may identify which organization manufactured the access point device (e.g., whether the AP is made by Cisco Systems, Inc.), and may be assigned to such organizations by the Institute of Electrical and Electronic Engineers (IEEE). The second 3 bytes of the MAC address, which may be referred to as the network interface controller (NIC) specific bytes, may be used to uniquely identify the individual access point device.

The APLS 130, which stores the MAC addresses and location coordinates of a plurality of deployed access points (e.g., not just access points AP1-AP3 of FIG. 1), is an online database accessible by mobile device 110 that may be provided by companies such as Google, Skyhook, Devicescape, and/or WiGLE. The APLS 130 may also store other information associated with the access points including, for example, the accuracy of the location coordinates of each access point, the last location update for each access point, the last time each access point was visible, the protocol version of each access point, and so on. For some embodiments, selected portions of the APLS 130 can be retrieved and stored within mobile device 110, as described in more detail below.

Mobile device 110, which may also be referred to herein as the client device, can be any suitable W-Fi enabled wireless device including, for example, a cell phone, a PDA, a tablet computer, a laptop, or the like. For the embodiments described herein, mobile device 110 includes radio frequency (RF) ranging circuitry (e.g., formed using well-known software modules, hardware components, and/or a suitable combination thereof) that can be used to estimate the distance between itself and one or more visible access points (AP) using suitable ranging techniques. For example, mobile device 110 can use received signal strength indicator (RSSI) and/or round trip time (RTT) techniques to estimate the distance between itself and the access points AP1-AP3, for example, by correlating each RSSI or RTT value with a distance. In addition, mobile device 110 includes a local memory that stores a cache of Wi-Fi access point location data, and includes a processor that can execute WLAN positioning software and APLS data retrieval software. The positioning software can calculate the position of mobile device 110 using the known locations of visible access points as reference points. The data retrieval software can selectively request location data for Wi-Fi access points from the APLS using public and/or private fetching operations, and can dynamically switch between such private and public fetching operations in response to parameters such as motion of the mobile device, the storage capacity of the local cache memory, and/or the data retrieval history of the mobile device.

Figure 2:
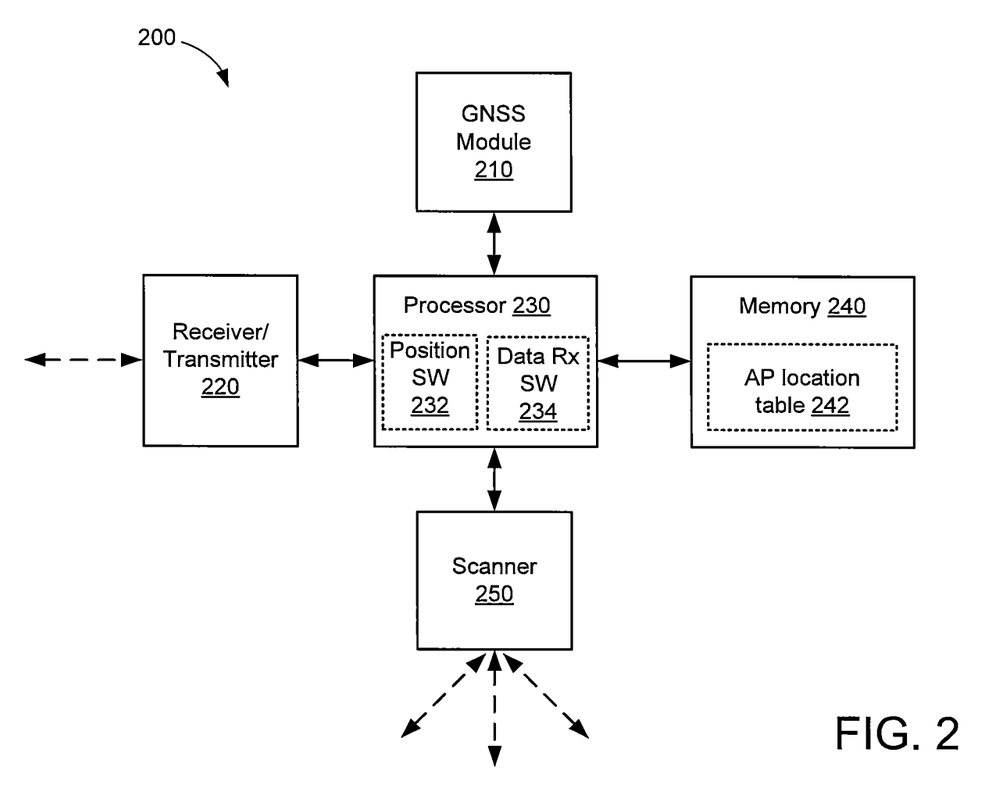
FIG. 2 is a block diagram of a mobile communication device in accordance with some embodiments.

More specifically, FIG. 2 shows a mobile device 200 that is one embodiment of mobile device 110 of FIG. 1. Mobile device 200 to include a global navigation satellite system (GNSS) module 210, a transmitter/receiver circuit 220, processor 230, a memory 240, and a scanner 250. The receiver/transmitter circuit 220 can be used to transmit signals to and receive signals from access points AP1-AP3 and/or APLS 130 (see also FIG. 1). Scanner 250, which is well-known, can be used to scan the surrounding environment to detect and identify nearby access points (e.g., access points within range of mobile device 200). For some embodiments, the scanner 250 can search for nearby access points by periodically transmitting MAC address request frames. An access point within range of mobile device 200 receives one or more of the requests and responds by transmitting its MAC address to the mobile device 200. If mobile device 200 has line-of-sight with a suitable number (e.g., 3 or more) navigation satellites, the GNSS module 210 can determine the current location of mobile device 200 using triangulation techniques, and can then provide the location information to processor 230 for storage in memory 240.

Memory 240, which can be any suitable memory element or device (e.g., EPROM, EEPROM, Flash memory, and so on), includes an access point location table 242 that can be used as a local cache to store the MAC addresses of a plurality of access points, the location coordinates of such access points, and other suitable location or configuration information of the access points. An exemplary format for one embodiment of the location table 242 associated with mobile device 200 is shown below in Table 1. The location table shown in Table 1 below includes a plurality (n) of row entries, each for a corresponding one of a plurality (n) of access points. More specifically, each row entry includes an access point field to store the name of the associated access point, a BSSID field to store the MAC address of the access point, a coordinate field to store the location coordinates of the access point, and an uncertainty field to store a location uncertainty value for the access point. For some embodiments, the location uncertainty value may be expressed as a percentage (e.g., ±5%). For other embodiments, the location uncertainty value may be expressed as a distance range (e.g., ±2 m). Of course, for still other embodiments, the location uncertainty value may be expressed using other suitable indications.

TABLE 1

| Access point | BSSID | Location coordinates | Location uncertainty |
|---|---|---|---|
| AP1 | MAC1 | x1, y1, z1 | UNC1 |
| AP2 | MAC2 | x2, y2, z2 | UNC2 |
| . | | | |
| . | | | |
| . | | | |
| APn | MACn | xn, yn, zn | UNC3 |

Processor 230, which is coupled to receiver/transmitter 220, GNSS module 210, memory 240, and scanner 250, can be any suitable processor capable of executing scripts or instructions of one or more software programs stored in mobile device 200 (e.g., within memory 240). More specifically, processor 230 is shown in FIG. 2 as including a WLAN positioning software module 232 and a data retrieval software module 234. The positioning software module 232 can be executed by processor 230 to determine the location of mobile device 200 using nearby access points as reference points. For example, to determine the position of mobile device 200, the precise locations of three selected access points (e.g., access points AP1-AP3) are first determined, either by accessing their location coordinates from memory 240 or by retrieving their location coordinates from the ALPS 130, as explained in more detail below. Next, mobile device 200 estimates the distance between itself and each of the selected access points using suitable RF ranging techniques (e.g., RSSI and/or RTT techniques). Then, positioning software module 232 uses the location coordinates of the selected access points and the estimated distances between them and mobile device 200 to calculate the position of mobile device 200 using trilateration techniques.

Data retrieval software module 234 can be executed by processor 230 to retrieve location information of visible and/or non-visible access points from the APLS 130. In accordance with the present embodiments, data retrieval software module 234 can selectively retrieve access point location information from the ALPS 130 using private fetching operations and/or public fetching operations, and can dynamically switch between the private and public fetching operations in response to one or more retrieval selection parameters to optimize data retrieval operations from the APLS 130. In accordance with some embodiments, the retrieval selection parameters may include motion of mobile device 200, the data retrieval history of mobile device 200, and/or the storage capacity/utilization of the access point location table 242 provided within memory 240 of mobile device 200. For other embodiments, the retrieval selection parameters can include additional information such as the mobile device's speed, direction, and/or status information. In addition, for some embodiments, the amount of data requested from the APLS 130 during public fetching operations can be dynamically adjusted in response to prior public fetching operations to minimize the retrieval of duplicate location data from the APLS 130.

When using private fetching operations to retrieve access point location data from the APLS 130, mobile device 200 requests the APLS 130 for location information of a specified set of access points that are visible to mobile device 200. More specifically, the mobile device 200 transmits to the APLS 130 a list of MAC addresses identifying the specific access points for which location information is requested. The MAC addresses of the specified visible access points can be determined using either active or passive access point detection techniques. In active detection techniques, mobile device 200 broadcasts probe requests to the surrounding environment. According to the IEEE 802.11 protocols, access points in receipt of the probe request transmit a beacon signal containing the MAC address of the access point and other information such as the network name, the precise version of the protocol that it supports, its security configuration, and information about how to connect to the access point. In passive detection techniques, mobile device 200 monitors beacon signals broadcast by the access points, whereby each beacon signal includes the MAC address of the corresponding access point and/or other information noted above with respect to the active detection technique.

Figure 3A:
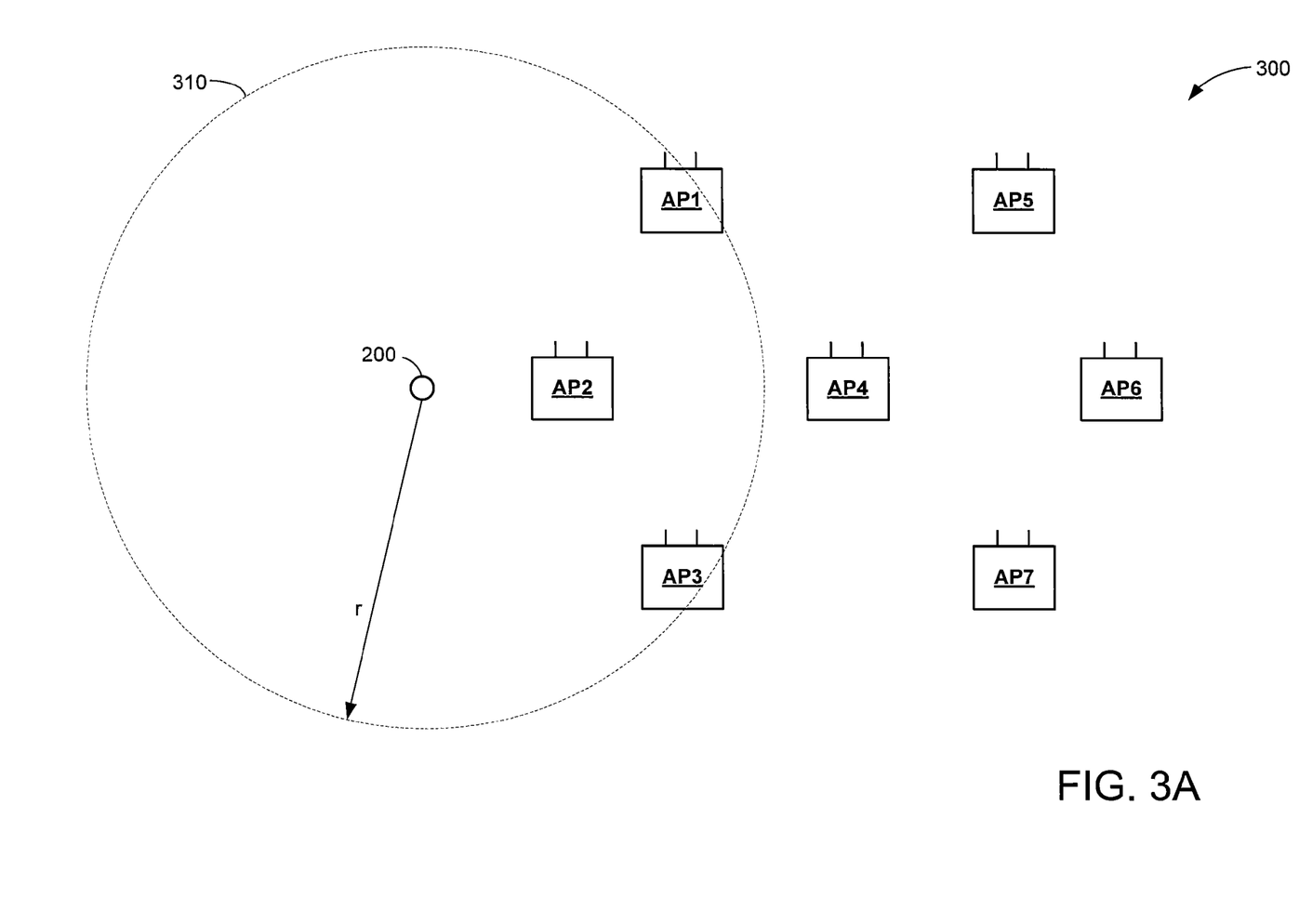
FIG. 3A depicts the reception range of the mobile device of FIG. 2 relative to a number of access points at a first time for initiating private fetching data retrieval operations in accordance with the present embodiments.

For one example, FIG. 3A shows an exemplary operating environment 300 for mobile device 200 at a first time t1. Mobile device 200 is shown to be in the proximity of seven access points AP1-AP7 that together may form a WLAN. Mobile device 200 has a range depicted by circle 310 having a radius r. Thus, mobile device 200 can detect access points within a distance "r" from itself. More specifically, as shown in FIG. 3A, at time t1, three access points AP1-AP3 are within reception range of mobile device 200, and therefore mobile device 200 can detect the MAC addresses of the three access points AP1-AP3, and can subsequently request their location information from the APLS 130 in a private fetching operation by providing the MAC addresses of AP1-AP3 to the APLS 130.

Figure 3B:
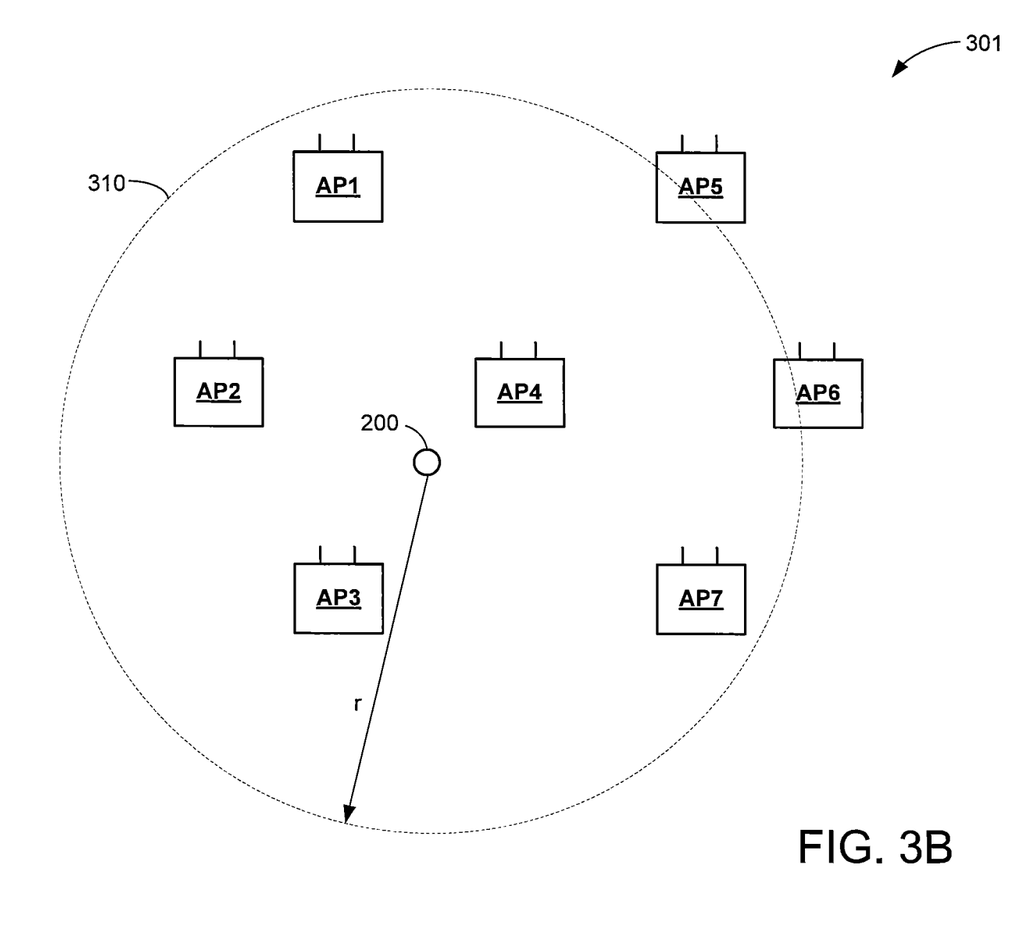
FIG. 3B depicts the reception range of the mobile device of FIG. 2 relative to the number of access points at a second time for initiating private fetching data retrieval operations in accordance with the present embodiments.

For another example, FIG. 3B shows an exemplary operating environment 301 for mobile device 200 at a second time t2. Mobile device 200 is shown to be in the proximity of seven access points AP1-AP7 that together may form a WLAN, and has a range depicted by circle 310 having radius r. Thus, mobile device 200 can detect access points AP1-AP7 because all seven access points AP1-AP7 are within reception range of mobile device 200. Accordingly, mobile device 200 can detect the MAC addresses of the seven access points AP1-AP7 at time t2, and can subsequently request their location information from the APLS 130 in a private fetching operation by providing the MAC addresses of AP1-AP7 to the APLS 130.

Referring again to FIG. 2, once the MAC addresses of the visible access points are obtained, the data retrieval software module 234 first checks the access point location table 242 within memory 240 to determine whether location table 242 stores the location information of the specified access points. If so, then the location information is provided to the positioning software module 232 to calculate the position of mobile device 200. If not, then the data retrieval software module 234 transmits the MAC addresses of the specified access points to the APLS 130. In response thereto, the APLS 130 uses the provided MAC addresses as look-up values to access the location information of the requested access points, and then transmits the requested location information to mobile device 200. Thereafter, mobile device 200 can use the retrieved location information to calculate the position of mobile device 200.

When using public fetching operations to retrieve access point location data from the APLS 130, mobile device 200 requests the APLS 130 to provide location information of access points that lie within a preferred geographic area, even if some (or all) of such access points are not currently visible to mobile device 200. In accordance with the present embodiments, the preferred geographic area may be defined using a reference location $P_R(t)$ of mobile device 200 and two geographic area configuration parameters $d_e$ and $d_n$, where $d_e$ defines an eastern boundary of the preferred geographic area and $d_n$ defines a northern boundary of the preferred geographic area. Of course, for other embodiments, other geographic configuration parameters can be used to define the preferred geographic area.

Figure 4:
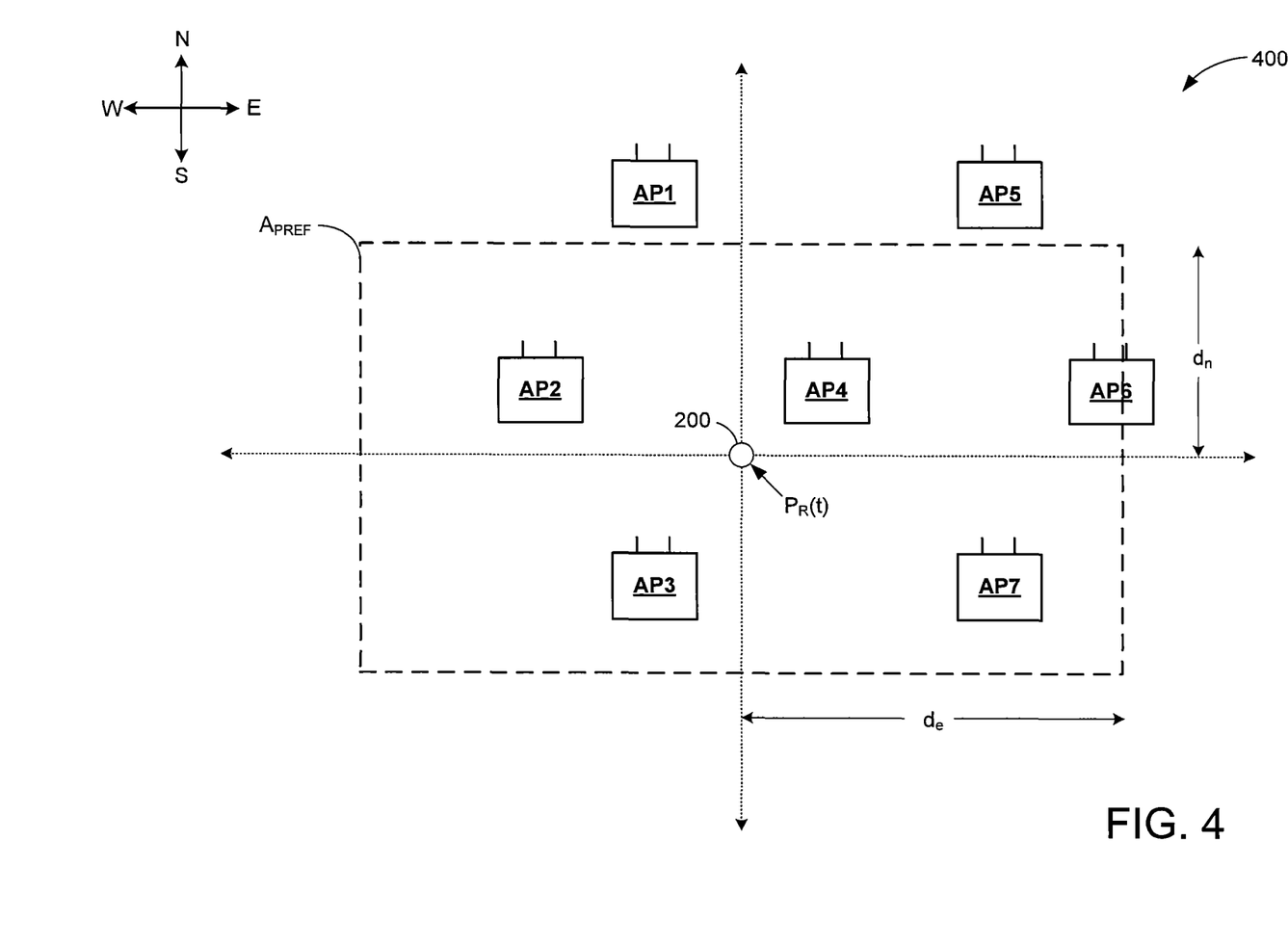
FIG. 4 depicts a current location of the mobile device of FIG. 2 and its preferred geographic retrieval area relative to a number of access points for initiating public fetching data retrieval operations in accordance with the present embodiments.

For example, FIG. 4 shows an exemplary operating environment 400 for mobile device 200 associated with the initiation of a public fetching data retrieval operation from the APLS 130 in accordance with the present embodiments. Mobile device 200 is shown to be in the proximity of seven access points AP1-AP7 that together may form a WLAN. Mobile device 200 has a current reference location of $P_R(t)$, and has a preferred geographic data retrieval area ($A_{PREF}$) that is bounded on an eastern edge by the parameter $d_e$ and bounded on a northern edge by the parameter $d_n$, whereby the total area of $A_{PREF}$ may be expressed as $2d_e*2d_n$. During public fetching operations from the APLS 130 performed in accordance with the present embodiments, mobile device 200 transmits its current reference location $P_R(t)$ and preferred area parameters $d_e$ and $d_n$ to the APLS 130. In response thereto, the APLS 130 identifies all known access points that lie within the preferred area $A_{PREF}$ defined by reference location $P_R(t)$ and area parameters $d_e$ and $d_n$. As depicted in FIG. 4, access points AP2-AP4 and AP6-AP7 lie within $A_{PREF}$, and therefore the ALPS 130 provides mobile device 200 with location information for the set of access points that includes AP2-AP4 and AP6-AP7.

By retrieving location information for access points that are not visible to mobile device 200, public fetching operations can reduce latency in calculating the position of mobile device 200 by "pre-fetching" location coordinates of access points before mobile device 200 is within their range. In addition, retrieving the location coordinates of access points not yet visible to mobile device 200 can allow mobile device 200 to later calculate its position using such access points even if the connection to the APLS 130 is subsequently lost or unavailable.

Although beneficial in reducing latencies associated with calculating the position of mobile device 200, using public retrieval operations to obtain access point location information from the APLS 130 not only increases the amount of data transmitted to mobile device 200 from the APLS 130 but also requires additional storage area in the mobile device's local cache (e.g., access point location table 242) because the mobile device 200 may retrieve more access point location information than it currently needs. Thus, in accordance with the present embodiments, mobile device 200 is configured to dynamically switch between private fetching and public fetching operations to optimize data retrieval operations from the APLS 130. Further, for some embodiments, the geographic area associated with public fetching operations from the APLS 130 can be dynamically modified in response to one or more public fetching parameters including, for example, the storage area utilization of the mobile device's location table 242, the refresh rate of the APLS 130, and/or the time lapsed between the current public fetching operation and the most recent prior public fetching operation.

Figure 5:
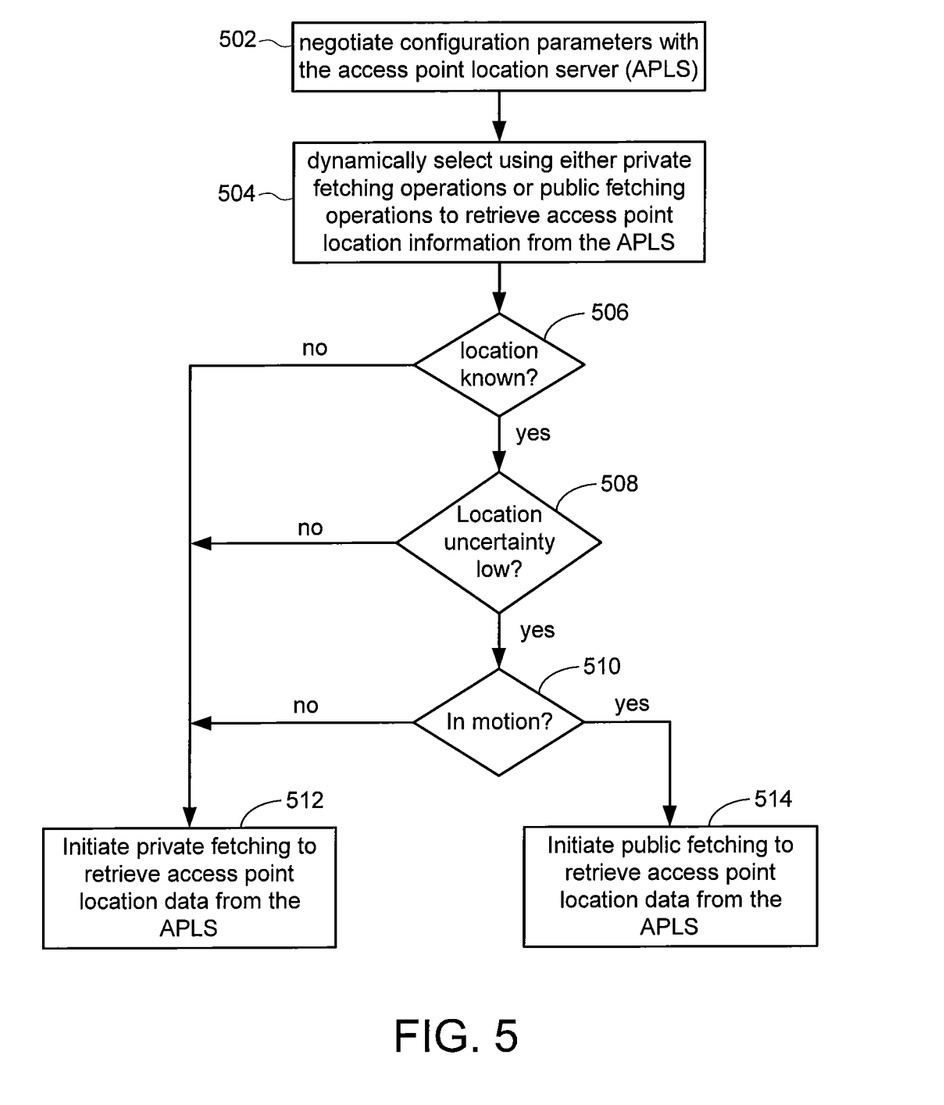
FIG. 5 is an illustrative flow chart depicting an exemplary operation for selecting either private fetching or public fetching operations to retrieve access point location data from an access point location server.

An exemplary operation for dynamically selecting between private and public fetching data retrieval operations from the APLS 130 in accordance with the present embodiments is described below with respect to the illustrative flow chart of FIG. 5. First, mobile device 200 negotiates a number of configuration parameters with the APLS 130 (502). The configuration parameters can include the maximum number ($N_{AP\_MAX}$) of access points for which location data can be stored in the mobile device's local memory (e.g., the size of Table 1 provided by access point location table 242), the geographic area parameters ($d_e$ and $d_n$) that define the preferred geographic area selected for public fetching data retrieval operations, a refresh time ($t_{R\_APLS}$) indicating how often the APLS 130 updates location information provided to mobile device 200, and/or the time lapsed between the current public fetching operation and the most recent prior public fetching operation. For some embodiments, the parameter $N_{AP\_MAX}$ is selected by mobile device 200 and transmitted to the APLS 130; the geographic area parameters $d_e$ and $d_n$ are selected by mobile device 200, transmitted to the APLS 130, and can be selectively modified by the APLS 130; and the refresh time $t_{R\_APLS}$ (e.g., intrinsic to the APLS 130) is selected by the APLS 130 and transmitted to mobile device 200.

Then, when mobile device 200 needs access point location information that is not already stored in its location table 242, mobile device 200 dynamically selects either private fetching operations or public fetching operations to retrieve the access point location information from the APLS 130 (504). An exemplary operation for selecting either private fetching operations or public fetching operations in 504 is described in more detail below with respect to steps 506, 508, 510, 512, and 514. Thus, for some embodiments, mobile device 200 first determines whether its reference location $P_R(t)$ is known (506). The reference location may be either the absolute location of mobile device 200 (e.g., its current latitude and longitude coordinates) or the centroid of the set of access points that are currently visible to mobile device 200. If the location of mobile device 200 is not known, as tested at 506, then mobile device 200 initiates private fetching operations to retrieve access point location data from the APLS 130 (512). As discussed above, to initiate a private fetching data retrieval operation with the APLS 130, mobile device 200 scans its environment for visible access points, determines the MAC addresses of the visible access points, and then transmits a list of MAC addresses corresponding to the visible access points as look-up values to the APLS 130.

Conversely, if the location of mobile device 200 is known, then mobile device 200 further determines whether the uncertainty of the reference location ($P_{unc}$) is less than a predetermined uncertainty threshold value ($V_{unc}$) (508). For some embodiments, the uncertainty threshold value ($V_{unc}$) may be expressed as a function of the geographic area parameters $d_e$ and $d_n$ (e.g., where $V_{unc}$=min($d_e$, $d_n$)).

If the uncertainty of the reference location ($P_{unc}$) is greater than the predetermined uncertainty threshold value ($V_{unc}$), which indicates a relatively high level of uncertainty as tested at 508, then mobile device 200 initiates a private fetching data retrieval operation from the APLS 130 (512). Conversely, if the uncertainty of the reference location ($P_{unc}$) is less than or equal to the predetermined uncertainty threshold value ($V_{unc}$), which indicates a relatively low level of uncertainty as tested at 508, then mobile device 200 further determines whether it is in motion (510). For some embodiments, the mobile device 200 may determine that it is in motion if the mobile device 200 has moved more than a predetermined distance from its previous location. For such embodiments, a change in the mobile device's location that is greater than the predetermined distance may indicate that the mobile device 200 is now in range of one or more access points that were not previously in range (e.g., not visible) and/or whose location information was not previously stored in the mobile device 200. Conversely, if the mobile device 200 has not moved more than the predetermined distance from its previous location, then it may be surmised that the mobile device 200 is not in motion but is rather relatively stationary. For such embodiments, deeming the mobile device 200 to be relatively stationary may indicate that the mobile device 200 does not yet need to acquire location information for additional access points that are not currently visible to the mobile device 200 and/or whose location information is not currently stored in the mobile device 200.

If mobile device 200 is not in motion, as tested at 510, mobile device 200 initiates a private fetching data retrieval operation from the APLS 130 (512). Conversely, if mobile device 200 is in motion, as tested at 510, then mobile device 200 initiates a public fetching data retrieval operation from the APLS 130 (514). As discussed above, to initiate a public fetching data retrieval operation with the APLS 130 in accordance with the present embodiments, mobile device 200 transmits its current reference location $P_R(t)$ and the geographic configuration parameters $d_e$ and $d_n$ to the APLS 130. In response thereto, the APLS 130 determines the preferred geographic area, identifies a set of known access points that lie within the preferred geographic area, and then transmits the location information of the set of identified access points to mobile device 200.

For some embodiments, the APLS 130 can selectively alter the size of the preferred geographic area requested by mobile device 200. For example, for one embodiment, if the number of access points that lie within the preferred geographic area is greater than the number of access point location entries available in the mobile device's location table 242 (e.g., as communicated to the APLS 130 from mobile device 200 as parameter $N_{AP\_MAX}$), then the APLS 130 can reduce the size of the preferred geographic area until the requested location information is of a size that can be stored in the mobile device's location table 242.

Further, mobile device 200 can determine whether it is in motion or relatively stationary using any number of suitable techniques. For some embodiments, mobile device 200 can compare its current reference location $P_R(t1)$ with the reference location used in a most recent prior public request $P_R(t0)$. If the difference in reference locations $|P_R(t1)-P_R(t0)|$ is greater than a predetermined distance threshold $D_{TH}$, then mobile device 200 may conclude that it is in motion, and then select the public fetching operation to retrieve access point location data from the APLS 130. Conversely, if the difference in reference locations $|P_R(t1)-P_R(t0)|$ is less than or equal to the predetermined distance threshold $D_{TH}$, then mobile device 200 may conclude that it is not in motion (e.g., relatively stationary), and then select the private fetching operation to retrieve access point location data from the APLS 130.

Figure 6:
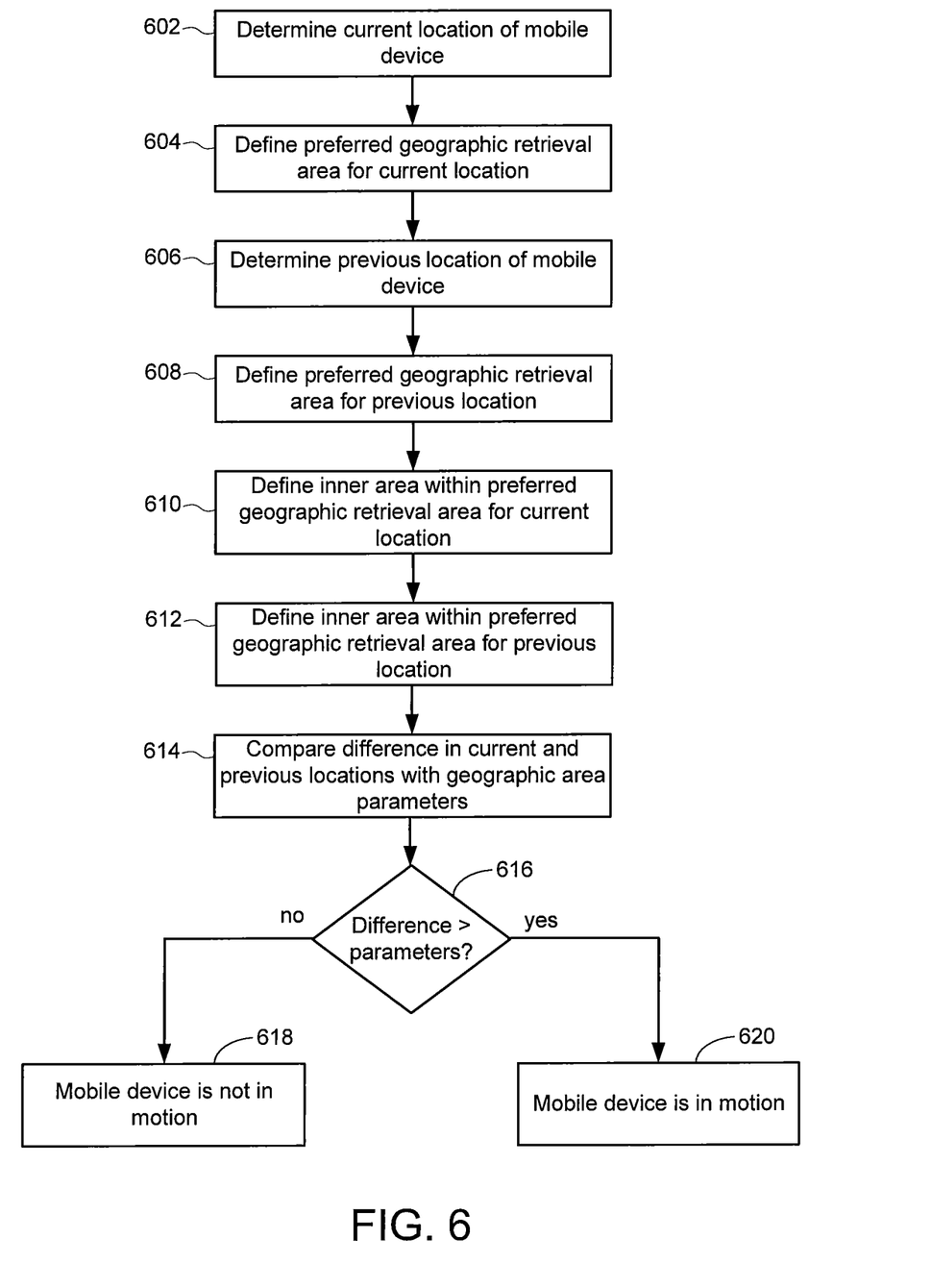
FIG. 6 is an illustrative flow chart depicting an exemplary operation for determining whether the mobile device of FIG. 2 is in motion.

More specifically, for some embodiments, mobile device 200 may determine whether it is in motion by comparing the difference in its north-south movement with a first distance threshold and comparing the difference in its east-west movement with a second distance threshold, as described below with respect to the illustrative flow chart of FIG. 6. Now, referring to FIG. 6, mobile device 200 determines its current location (at time t1), denoted herein as $P_R(t1)$ (602), and then defines its preferred geographic retrieval area $A_{PREF}(t1)$ for the current location using the geographic parameters $d_e$ and $d_n$ (604).

Figure 7:
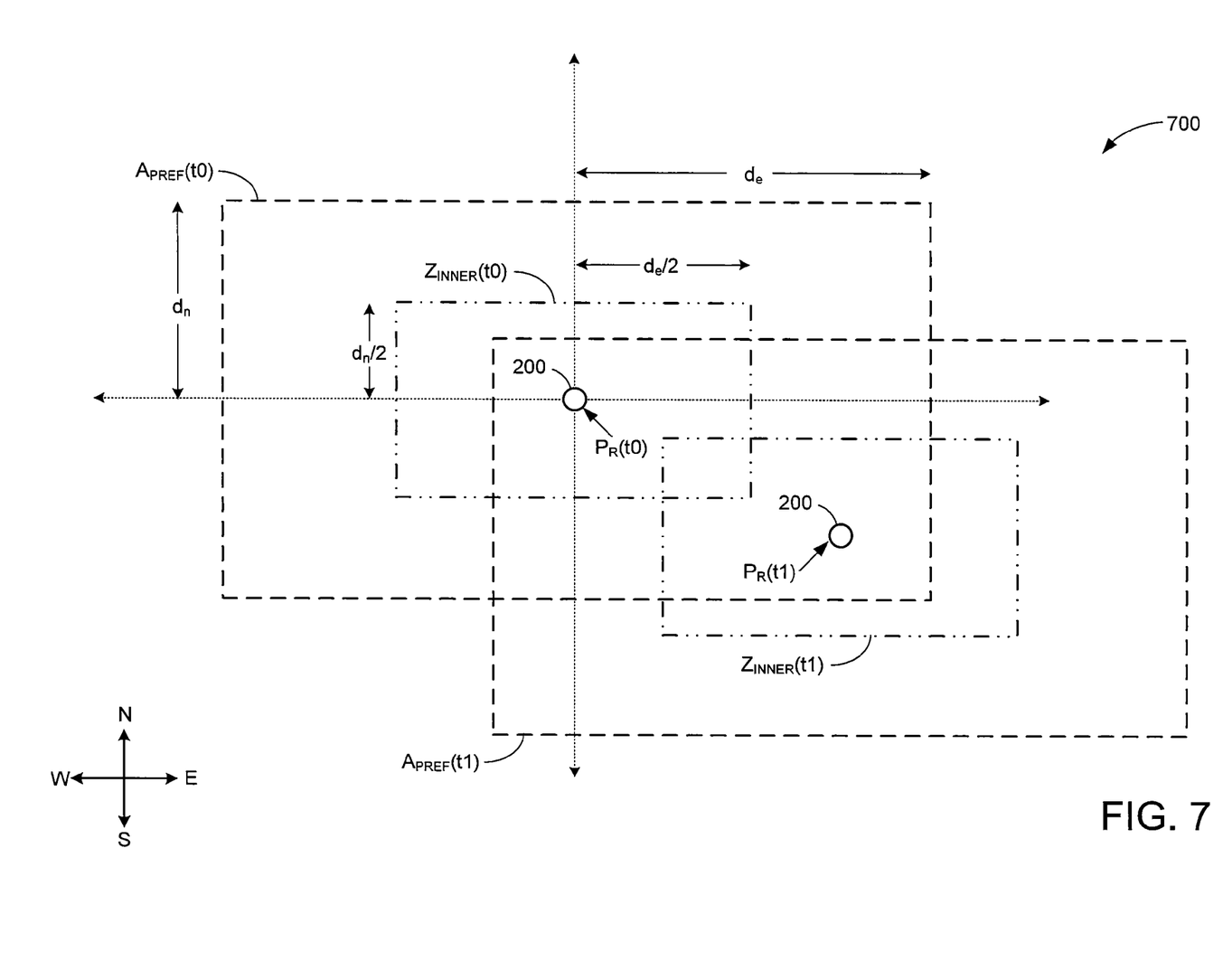
FIG. 7 depicts an exemplary operation for determining whether the mobile device of FIG. 2 is in motion.

For example, FIG. 7 is a diagram 700 that depicts mobile device 200 having a current location $P_R(t1)$ and a preferred geographic retrieval area $A_{PREF}(t1)$ at time t1. For some embodiments, mobile device 200 can use RF ranging techniques to estimate the distance between itself and a number of visible access points, and then use the known locations of those access points and trilateration techniques to calculate its location. For other embodiments, mobile device 200 can estimate its current location as the centroid of all access points visible thereto.

Next, mobile device 200 retrieves, from its local memory 240, its previous reference location associated with its most recent prior public request from the APLS 130 (at time t0), denoted herein as $P_R(t0)$ (606), and then defines its preferred geographic retrieval area $A_{PREF}(t0)$ for the previous location using the geographic parameters $d_e$ and $d_n$ (608). For some embodiments, the previous reference location of mobile device 200 may be stored in its memory 240 (see also FIG. 2). For example, FIG. 7 depicts mobile device 200 having a previous location $P_R(t0)$ and a preferred geographic retrieval area $A_{PREF}(t0)$ at time t0.

Then, mobile device 200 defines a current inner area $Z_{INNER}(t1)$ centered at $P_R(t1)$ using parameters $\alpha d_e$ and $\alpha d_n$, where $\alpha$ is a retrieval frequency parameter ($0<\alpha \leq 1$) that defines how often mobile device 200 can initiate public requests from the APLS 130 (610). Mobile device 200 also defines a previous inner area $Z_{INNER}(t0)$ centered at $P_R(t0)$ using parameters $\alpha d_e$ and $\alpha d_n$ (612). For example, FIG. 7 depicts $Z_{INNER}(t1)$ centered at $P_R(t1)$ and $Z_{INNER}(t0)$ centered at $P_R(t0)$ for $\alpha=0.5$.

Subsequently, mobile device 200 compares the difference between the current and previous locations $P_R(t1)$ and $P_R(t0)$ with the geographic parameters $d_n$ and $d_e$ (614). If the difference between the current and previous reference locations is less than or equal to the geographic area parameters, at tested at 616, then mobile device 200 concludes that it is not in motion (618). Conversely, if the difference between the current and previous reference locations is greater than the geographic area parameters, at tested at 616, then mobile device 200 concludes that it is in motion (620).

More specifically, for some embodiments, to perform steps 614 and 616 of flow chart 600, mobile device 200 first determines if the difference in east-west components of the current and previous reference locations is less than or equal to the east geographic area parameter $d_e$ (i.e., whether $|P_{Re}(t1)-P_{Re}(t0)| \leq d_e$) and determines if the difference in north-south components of the current and previous reference locations is less than or equal to the north geographic area parameter $d_n$ (i.e., whether $|P_{Rn}(t1)-P_{Rn}(t0)| d_n$). Thus, if both $|P_{Re}(t1)-P_{Re}(t0)| \leq d_e$ and $|P_{Rn}(t1)-P_{Rn}(t0)| \leq d_n$, which indicates that mobile device 200 is currently within the previous inner area $Z_{INNER}(t0)$, then mobile device 200 concludes that it is not in motion and a private request is sent to APLS 130 to retrieve access point location data therefrom. Conversely, if either $|P_{Re}(t1)-P_{Re}(t0)| > d_e$ or $|P_{Rn}(t1)-P_{Rn}(t0)| > d_n$, which indicates that mobile device 200 is currently outside the previous inner area $Z_{INNER}(t0)$, as depicted in FIG. 7, then mobile device 200 concludes that it is in motion and a public request is sent to APLS 130 to retrieve access point location data therefrom.

Further, if the time duration between times t0 and t1 is greater than the refresh rate of the APLS 130 (i.e., if $\Delta t=t1-t0 > t_{APLS}$), then mobile device 200 requests the APLS 130 to provide access point location data for the entire current preferred geographic retrieval area $A_{PREF}(t1)$. Conversely, if the time duration between times t0 and t1 is less than or equal to the refresh rate of the APLS 130 (i.e., if $\Delta t=t1-t0 \leq t_{APLS}$), then mobile device 200 requests the APLS 130 to provide access point location data only for selected areas of $A_{PREF}(t1)$ that do not overlap with $A_{PREF}(t0)$. In this manner, by dynamically adjusting the size of the area to be fetched from the APLS 130, mobile device 200 does not retrieve duplicate data from the APLS 130.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. For example, method steps depicted in the flow charts of FIGS. 5 and 6 can be performed in other suitable orders and/or one or more methods steps may be omitted.

What is claimed is:

1. In a wireless network having a plurality of access points, a method performed by a mobile device for selectively retrieving location information of the access points from an access point location server, the method comprising:
   negotiating a number of configuration parameters with the location server, wherein one of the configuration parameters comprises a geographic area parameter indicating a preferred retrieval area for the mobile device;
   determining whether the mobile device is in motion;
   if the mobile device is not in motion, requesting the location server to provide, in a private fetching operation, location information of access points that are visible to the mobile device;
   if the mobile device is in motion, requesting the location server to provide, in a public fetching operation, location information of access points that lie within the preferred retrieval area;
   determining when a current public fetching operation was requested by the mobile device;
   determining when a previous public fetching operation was requested by the mobile device;
   comparing a difference in time between the current public fetching operation request and the previous public fetching operation request with a refresh rate of the location server; and
   selectively reducing a size of the preferred retrieval area in response to the comparing.

2. The method of claim 1, wherein requesting the location server to provide location information in the private fetching operation further comprises:
   determining a media access control (MAC) address for each of the visible access points; and
   transmitting the MAC addresses of the visible access points as look-up values to the location server.

3. The method of claim 1, wherein requesting the location server to provide location information in the public fetching operation further comprises:
   determining a current location of the mobile device; and
   transmitting the current location to the location server.

4. The method of claim 3, further comprising:
   identifying, in the location server, the access points that lie within the preferred retrieval area of the mobile device's current location; and
   transmitting location information of the identified access points to the mobile device.

5. The method of claim 1, wherein determining whether the mobile device is in motion comprises:
   determining first positional information of the mobile device at a first time;
   determining second positional information of the mobile device at a second time; and
   comparing the first and second positional information with each other.

6. The method of claim 1, further comprising:
   dynamically switching between the private fetching operation and the public fetching operation in response to the determining.

7. The method of claim 1, further comprising:
   determining a value indicating an uncertainty of the mobile device's current location; and
   initiating the private fetching operation if the value is greater than a predetermined threshold.

8. The method of claim 1, wherein another of the configuration parameters comprises a refresh time indicating how frequently the location server updates location data provided to the mobile device.

9. A system for selectively retrieving location information of a number of wireless access points from an access point location server to a mobile device, the system comprising:
   means for negotiating a number of configuration parameters with the location server, wherein one of the configuration parameters comprises a geographic area parameter indicating a preferred retrieval area for the mobile device;
   means for determining whether the mobile device is in motion;
   means for requesting the location server to provide, in a private fetching operation, location information of access points that are visible to the mobile device if the mobile device is not in motion;
   means for requesting the location server to provide, in a public fetching operation, location information of access points that lie within the preferred retrieval area if the mobile device is in motion;
   means for determining when the current public fetching operation was requested by the mobile device;
   means for determining when a previous public fetching operation was requested by the mobile device;
   means for comparing a difference in time between the current public fetching operation request and the previous public fetching operation request with a refresh rate of the location server; and means for selectively reducing the size of the preferred retrieval area in response to the comparing.

10. The system of claim 9, wherein the means for requesting the location server to provide location information in the public fetching operation further comprises:
means for determining a current location of the mobile device; and
means for transmitting the current location to the location server.

11. The system of claim 10, further comprising:
means for identifying, in the location server, a list of access points that lie within the preferred area of the mobile device's current location; and
means for transmitting location information of the identified access points to the mobile device.

12. The system of claim 9, wherein determining whether the mobile device is in motion comprises:
means for determining first positional information of the mobile device at a first time;
means for determining second positional information of the mobile device at a second time; and
means for comparing the first and second positional information with each other.

13. The system of claim 9, further comprising:
means for dynamically switching between the private fetching operation and the public fetching operation in response to the determining.

14. The system of claim 9, further comprising:
means for determining a value indicating an uncertainty of the mobile device's current location; and
means for initiating the private fetching operation if the value is greater than a predetermined threshold.

15. The system of claim 9, wherein another of the configuration parameters comprises a refresh time indicating how frequently the location server updates location data provided to the mobile device.

16. A system for selectively retrieving location information for a number of wireless access points from an access point location server to a mobile device, wherein the mobile device comprises:
a processor; and
a memory coupled to the processor and having stored therein computer-executable instructions that when executed cause the system to:
negotiate a number of configuration parameters with the location server, wherein one of the configuration parameters comprises a geographic area parameter indicating a preferred retrieval area for the mobile device;
determine whether the mobile device is in motion;
request the location server to provide, in a private fetching operation, location information of access points that are visible to the mobile device if the mobile device is not in motion;
request the location server to provide, in a public fetching operation, location information of access points that lie within the preferred retrieval area if the mobile device is in motion;
determine when the current public fetching operation was requested by the mobile device;
determine when a previous public fetching operation was requested by the mobile device;
compare a difference in time between the current public fetching operation request and the previous public fetching operation request with a refresh rate of the location server; and
selectively reduce the size of the preferred retrieval area in response to the comparing.

17. The system of claim 16, wherein when requesting the location server to provide location information in the private fetching operation, the instructions further cause the system to:
determine a media access control (MAC) address for each of the visible access points; and
transmit the MAC addresses of the visible access points as look-up values to the location server.

18. The system of claim 16, wherein when requesting the location server to provide location information in the public fetching operation, the instructions further cause the system to:
determine a current location of the mobile device; and
transmit the current location to the location server.

19. The system of claim 18, wherein the instructions further cause the system to:
identify, in the location server, the access points that lie within the preferred retrieval area of the mobile device's current location; and
transmit location information of the identified access points to the mobile device.

20. The system of claim 16, wherein to determine whether the mobile device is in motion, the instructions further cause the system to:
determine first positional information of the mobile device at a first time;
determine second positional information of the mobile device at a second time; and
compare the first and second positional information with each other.

21. The system of claim 16, wherein the instructions further cause the system to:
dynamically switch between the private fetching operation and the public fetching operation in response to whether the mobile device is in motion.

22. The system of claim 16, wherein the instructions further cause the system to:
determine a value indicating an uncertainty of the mobile device's current location; and
initiating the private fetching operation if the value is greater than a predetermined threshold.

23. The system of claim 16, wherein another of the configuration parameters comprises a refresh time indicating how frequently the location server updates location data provided to the mobile device.

* * * * *